(12) United States Patent
Elking (10) Patent No.: US 11,436,128 B2
(45) Date of Patent: Sep. 6, 2022

(54) SYSTEM AND COMPUTER IMPLEMENTED METHOD FOR GENERATING TEST SCRIPTS

(71) Applicant: CHARTER COMMUNICATIONS OPERATING, LLC, St. Louis, MO (US)

(72) Inventor: Mark Elking, O'Fallon, MO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 443 days.

(21) Appl. No.: 16/155,364

(22) Filed: Oct. 9, 2018

(65) Prior Publication Data

US 2020/0110694 A1 Apr. 9, 2020

(51) Int. Cl.
*G06F 11/36* (2006.01)
(52) U.S. Cl.
CPC ...... *G06F 11/3684* (2013.01); *G06F 11/3688* (2013.01); *G06F 11/3696* (2013.01)
(58) Field of Classification Search
CPC ............. G06F 11/3684; G06F 11/3688; G06F 11/3696

USPC ........................................................ 717/124
See application file for complete search history.

(56) References Cited

U.S. PATENT DOCUMENTS

| 6,993,748 | B2* | 1/2006 | Schaefer | G06F 11/3664 |
| | | | | 707/999.003 |
| 7,093,238 | B2* | 8/2006 | Givoni | G06F 11/3664 |
| | | | | 714/E11.208 |
| 7,165,240 | B2* | 1/2007 | Patterson | G06F 11/368 |
| | | | | 717/116 |
| 7,272,822 | B1* | 9/2007 | Riggins | G06F 9/451 |
| | | | | 717/124 |
| 2014/0325483 | A1* | 10/2014 | Pilot | G06F 11/3684 |
| | | | | 717/124 |
| 2016/0085662 | A1* | 3/2016 | Huang | G06F 11/3668 |
| | | | | 717/124 |
| 2019/0196946 | A1* | 6/2019 | Budhai | G06F 11/3688 |

* cited by examiner

*Primary Examiner* — Ryan D. Coyer
(74) *Attorney, Agent, or Firm* — Meagher Emanuel Laks Goldberg & Liao, LLP (57) ABSTRACT

Various embodiments comprise systems, methods, architectures, mechanisms or apparatus configured for automatically generating a testing script.

12 Claims, 12 Drawing Sheets

| Event | Event Description |
|---|---|
| ClickButton | This event will click a button |
| EnterDataTextbox | Value to enter into a textbox. For example, "1234". If you want to pull value from variable file, then indicate "FILE_(name of variable file)" to pull from. |
| LaunchBrowser | This will open the browser and sets current driver to IE or CHROME |
| NavigateToURL | Navigates to URL and maximizes window. TCTestData value should only be the column name corresponding to the URL as defined in the Column name in the Environment worksheet. |
| SelectListValueByVisibleText | Value to be selected from a listbox |

FIG. 3A

| ObjectName | TagName,Attribute,Value |
|---|---|
| ArterraBillingZipCode | NA,name,f15 |
| ArterraCancelOrder | NA,link,Cancel Order |
| ArterraCustomerInfoSubmitBtn | NA,xpath,//button/span[text()='Submit'] |
| ArterraCustomerSearchLink | NA,link,Customer Search |
| SPMobileContinueShopping | NA,xpath,//a[contains(text(),--FILE_ENV/Comms---,'Continue Shopping')] |
| SPMobileOOBMonthTextBox | NA,id,month |
| ArterraDeviceOrders&ActivationsLink | NA,link,Device Orders & Activations |

| Environment | QuestURL | QuestUserID | QuestPassID | AdditionalAttribute |
|---|---|---|---|---|
| DEV | http://www.quest-dev.com | User1 | Test1 | Value1 |
| QA | http://www.quest-qa.com | User2 | Test2 | Value2 |
| UAT | http://www.quest-uat.com | User3 | Test3 | Value3 |

FIG. 7

| Event | Object | Test Data |
|---|---|---|
| LaunchBrowser | NA | CHROME |
| NavigateToURL | NA | QuestURL |
| EnterDataTextbox | QUESTLOGIN_questuseridtextbox | VAR_QuestUserID |
| EnterDataTextbox | QUESTLOGIN_questpassidtextbox | VAR_QuestPassID |
| ClickButton | QUESTLOGIN_questloginbutton | |

FIG. 8A

| Event | Object | Test Data |
|---|---|---|
| LaunchBrowser | NA | CHROME |
| NavigateToURL | NA | QuestURL |
| EnterDataTextbox | QUESTLOGIN_questuseridtextbox | VAR_QuestUserID |
| EnterDataTextbox | QUESTLOGIN_questpassidtextbox | VAR_QuestPassID |
| EnterDataTextbox | QUESTLOGIN_questnetworksecuritycodetextbox | VAR_QuestNetworkSecurityCode |
| ClickButton | QUESTLOGIN_questloginbutton | |

FIG. 8B

| Environment | QuestURL | UserID | PassID | LoginComponent |
|---|---|---|---|---|
| DEV | http://www.quest-dev.com | User1 | Test1 | LOGINComponentB |
| QA | http://www.quest-qa.com | User2 | Test2 | LOGINComponentA |
| UAT | http://www.quest-uat.com | User3 | Test3 | LOGINComponentA |

FIG. 8C

| Event | Object | Test Data |
|---|---|---|
| Component | NA | VAR_LoginComponent |

FIG. 8D

| ObjectName | TagName,Attribute,Value | TagName,Attribute,Value,Environment (Overwrite) |
|---|---|---|
| AccountName | NA,name,Name | NA,name,Nam1,DEV----NA,id,namevalue,UAT |

FIG. 9

SYSTEM AND COMPUTER IMPLEMENTED METHOD FOR GENERATING TEST SCRIPTS

FIELD OF THE DISCLOSURE

The present disclosure generally relates to software and system component development, and more particularly to a framework for automatically generating test scripts for use in an integrated test environment.

BACKGROUND

Integrated test environments enable the testing of software and/or hardware components/modules associated with systems, system components and/or the integration of systems/system components such as part of a broader solution or product provided by company. Integrated test environments typically utilized testing scripts which define with specificity various testing criteria such as the type of tests to be performed, the system/system components to be tested, the data or data sets to be used within the context of the test, the expected/desired results of such tests and the like.

Generating testing scripts is difficult process requiring intimate knowledge of not only the specific testing goals and corresponding/relevant testing criteria, but the programming or scripting language by the specific testing goals and testing criteria are defined for use within the integrated test environment. Failure by test personnel to fully understand any of the testing goals, testing criteria and programming/scripting language result in poor testing scripts and, consequently, testing delays, testing errors, product production/delivery problems and the like. Therefore, test personnel must be highly skilled and highly trained to effectively generate testing scripts.

SUMMARY

Various deficiencies in the prior art are addressed by systems, methods, architectures, mechanisms or apparatus configured for automatically generating a testing script by iteratively generating, via a graphical user interface (GUI), a plurality of GUI screens including user selectable visual objects, each GUI screen being contextually related to a temporally adjacent GUI screen, each user selectable visual object being associated with one or more keyword events; for each indication of a visual object selection or a keyword entry, identifying one or more functions associated with the selected visual object or keyword entry; for each of the identified one or more functions, generating a respective testing script portion; and in response to an indication of a final keyword event selection, assembling the generated testing script portions in to a complete testing script.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

The various embodiments advantageously improve both the speed and quality of testing development and execution by enabling people who are not skilled in programming languages to effectively and quickly build automation scripts. The various embodiments provide a user friendly keyword driven approach to automating test scripts that does not require the creation of functionality (e.g., Java functionality) per test case, and does not require specific programming/scripting language experience of test personnel utilizing the embodiments.

Broadly speaking, the various embodiments provide a computer implemented method, framework or test utility for automatically generating test scripts in which a graphical user interface (GUI) displaying iteratively guides relatively low skill test personnel through a process of selecting displayed objects/fields and providing simplified/natural language expression of keyword events related to one or more desired tests or test criteria, where each of the keyword events is associated with one or more functions such as java functions, applets, software modules, subroutines and the like (such as by an Event to Function Map), where the keyword events associated with the simplified/natural language expression may be themselves modified based upon displayed or selected objects/fields, and where the testing script is iteratively generated by concatenating a plurality of keyword event associated functions and any related global functions. In various embodiments, objects/fields associated with subsequent GUI screens are adapted in response to user interaction with prior GUI screens such as by limiting selectable displayed objects/fields, natural language expression of particular keywords and the like.

Figure 1:
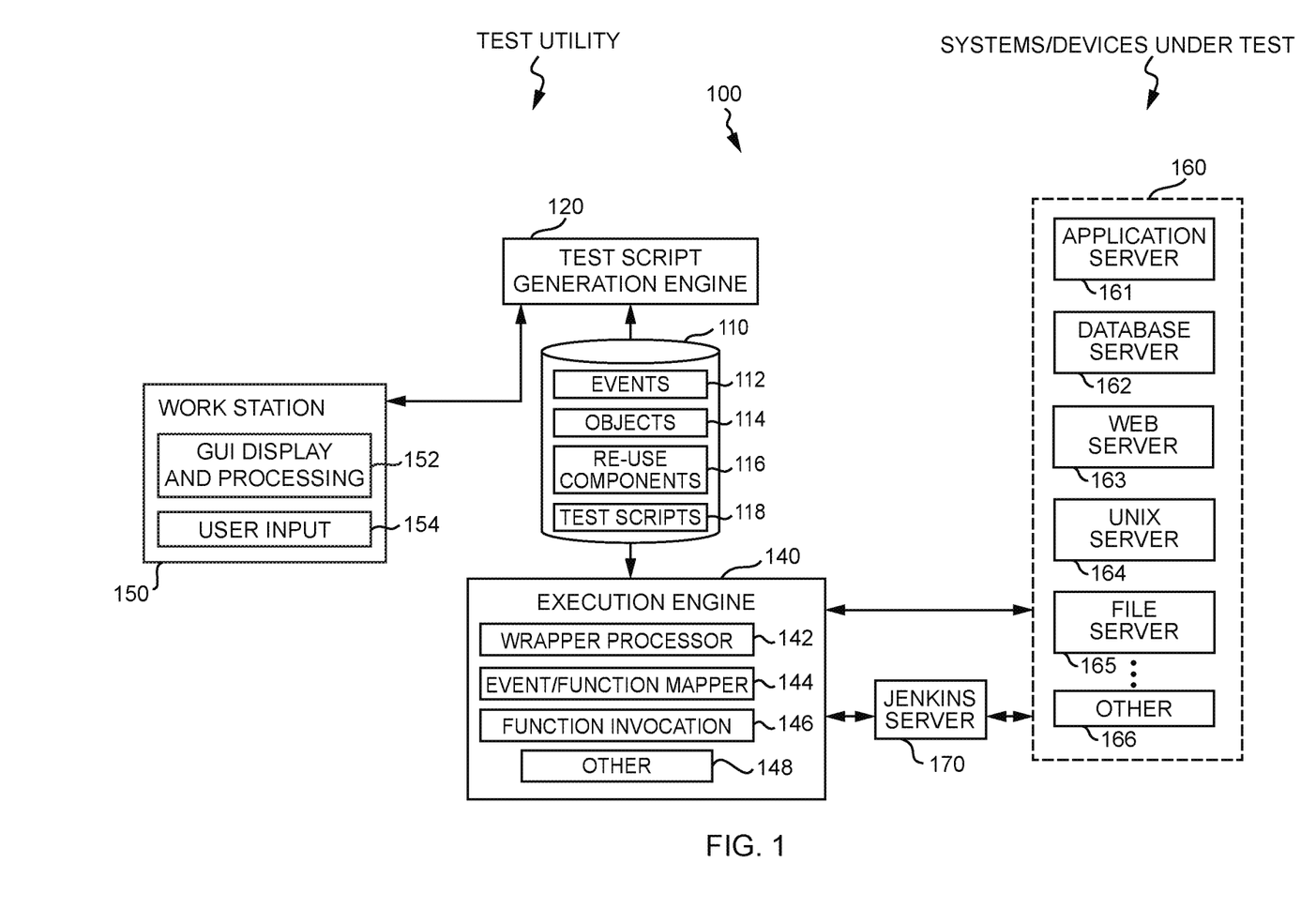
FIG. 1 depicts a high-level block diagram of a system benefiting from various embodiments.

FIG. 1 depicts a high-level block diagram of a system benefiting from various embodiments. Specifically, FIG. 1 depicts a system 100 generally comprising a test utility configured to perform various test script generation functions such as described herein, and providing one or more such test scripts to each of one or more systems/devices under test 160, either directly or via a Jenkins server 170 or within the context of a testing suite to perform quality control (QC), performance benchmarking, debugging or other functions. It will be appreciated by those skilled in the art that the exemplary system 100 depicted in FIG. 1 is only provided for illustrative purposes and that various embodiments apply to multiple types of test systems, integrated test system/environments and the like.

The system 100 is depicted as comprising a test script generation engine 120 in communication with each of a database 110 and workstation 150, and an execution engine 140 in communication with the database 110, a Jenkins server 170 and one or systems/devices under test 160. While depicted as comprising separate elements within the system 100 of FIG. 1, it will be appreciated that some or all of these elements may be combined within fewer or one functional element performing the various functions described herein, such as the integrated test script generation/execution engine 200 described below with respect to FIG. 2.

Generally speaking, the workstation 150 comprises a relatively standard workstation with a graphical user interface (GUI) display and processing module 152 and a user input module 154 operable to present GUI screens to a user and receive user input/selections responsive to such GUI screens.

The GUI display and processing module 152 receives GUI-related information from the test script generation engine 120, such as GUI screens, displayable/selectable objects, fields, imagery, X and the like. The GUI display and processing module 152 may be integrated with the user input module 154 such as via a touchscreen display; alternatively, these modules may be separate functional elements of a workstation or computing device implementing the functionality described herein with respect to the workstation. In various embodiments, the functionality associated with the workstation 150 is implemented by a remote computing device having instantiated thereon a web browser program operable to interact with the test script generation engine 120 in a client/server modality such as via the Internet or other computer network.

The database 110 stores various information for use by the test script generation engine 120. Such as keyword event data 112, objects/fields data 114, reuse components data 116 and test scripts data 118. It is noted that the database 110 is depicted in FIG. 1 as being a separate entity. However, in various embodiments the information within the database 110 may be stored within other data structures (not shown) or within the test script generation engine 120.

As depicted in FIG. 1, the database 110 stores information suitable for use in generating custom interactive GUI screens for presentation to a user via a workstation 150 or remote computer, which interactive GUI screens results in reduced complexity user input pertaining to a desired test script. The database 110 will be discussed simultaneously with the test script generation engine 120 within the context of a test utility according to various embodiments.

A Test Utility according to various embodiments may be organized into four main areas; namely (1) Keyword Events, (2) Objects/Fields, (3) Reusable Components, and (4) Automated Test Scripts. The keyword events, objects/fields and reusable components are described herein as being stored in database 110. The automated test scripts are generated in response to user input processed in accordance with the keyword events, objects/fields and reusable components. The automated test scripts may be stored in the database 110 or some of the stores location. Either of these databases may comprise an Oracle database, source query language (SQL) database or other database structure.

Keyword Events. In accordance with various embodiments, a number of keyword events are defined, where each of the keyword events corresponds to one or more functions such as Java functions and the like. The specific keyword events selected for inclusion in the database 110 generally comprise those keyword events necessary to perform all of the automation activities required by, for example, a particular testing organization or company implementing a test script generation solution in accordance with the various embodiments.

Each of the keyword events may be classified in accordance with one or more high-level categories, such as, illustratively: Web based UI interactions; Windows based UI interactions; Webservice XML operations; Unix based interactions; Windows based DOS file operations; Database SQL operations; Java String Manipulation operations and so on.

Figure 3A:
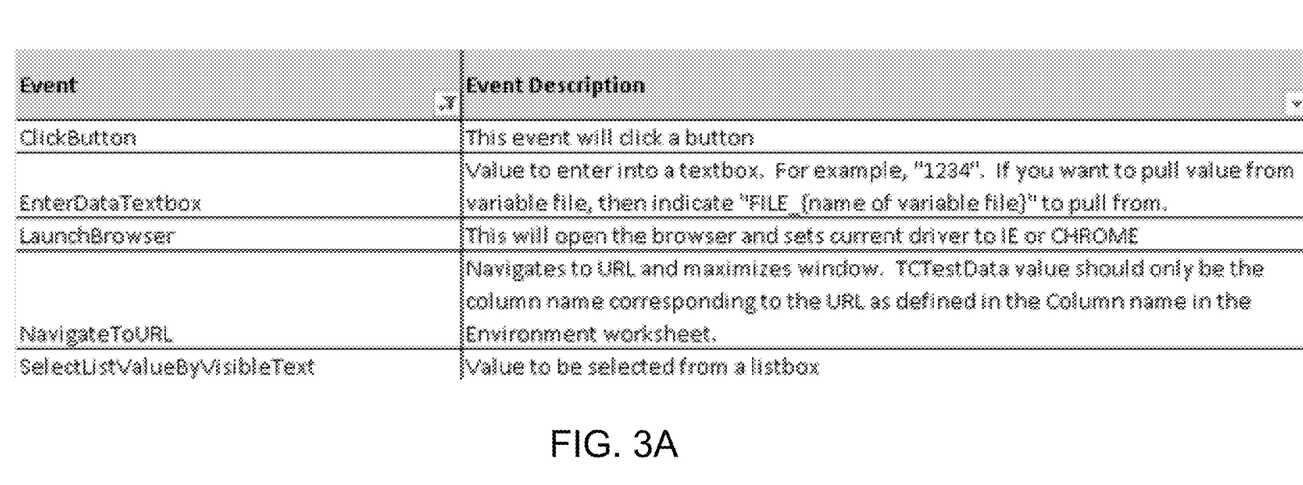
FIGS. 3A-3E depict tables providing illustrative examples of various entities, objects and the like useful in understanding the present embodiments.

In one embodiment, each event is associated with an event description, such as the subset of possible keyword events depicted in FIG. 3A. The keyword event definitions are stored in a database or other structure such as an Oracle database.

Objects/Fields. In accordance with various embodiments, a finite number of objects/fields are defined, where each of the object/field corresponds to one or more graphical elements suitable for use in GUI screens presented or provided to a user interacting with the test script generation engine 120. The specific objects/fields selected for possible inclusion I the GUI screens generally comprise those necessary to prompt for, and receive, the information (e.g., keyword event information) possibly required by, for example, a particular testing organization or company implementing a test script generation solution in accordance with the various embodiments.

Figure 3B:
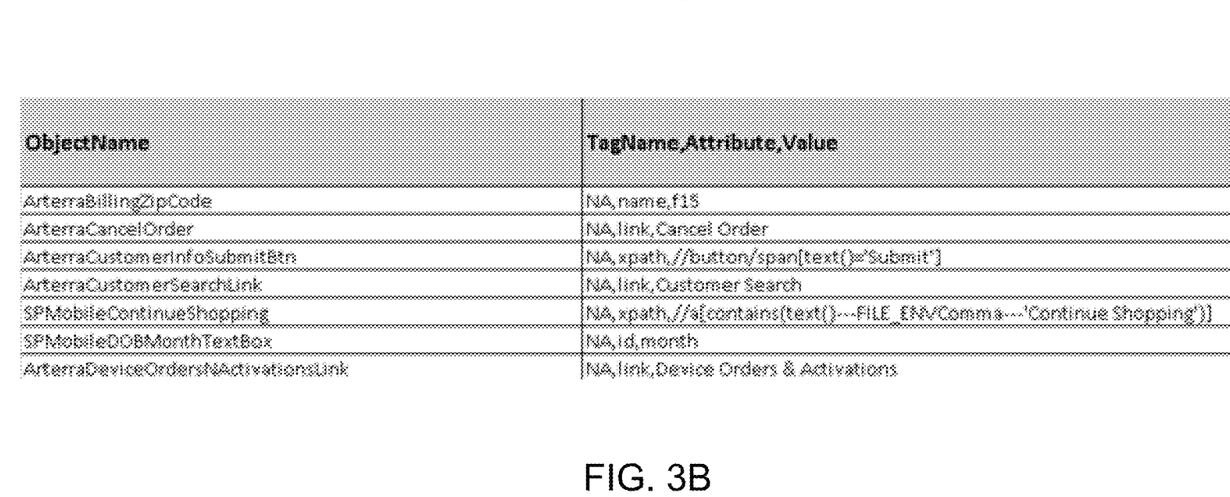

In accordance with various embodiments, a subset of a plurality of objects/fields suitable for use on Graphical User Interface screens are defined as shown with respect to FIG. 3B. Generally speaking, the ObjectName may comprise any relevant or useful Object Name, the TagName, Attribute and Value comprise the object definition such as provided by, illustratively, the DOM page object model, which model will uniquely identify a given object on the screen. The object definitions are stored in a database or other structure such as an Oracle database.

Figure 3C:
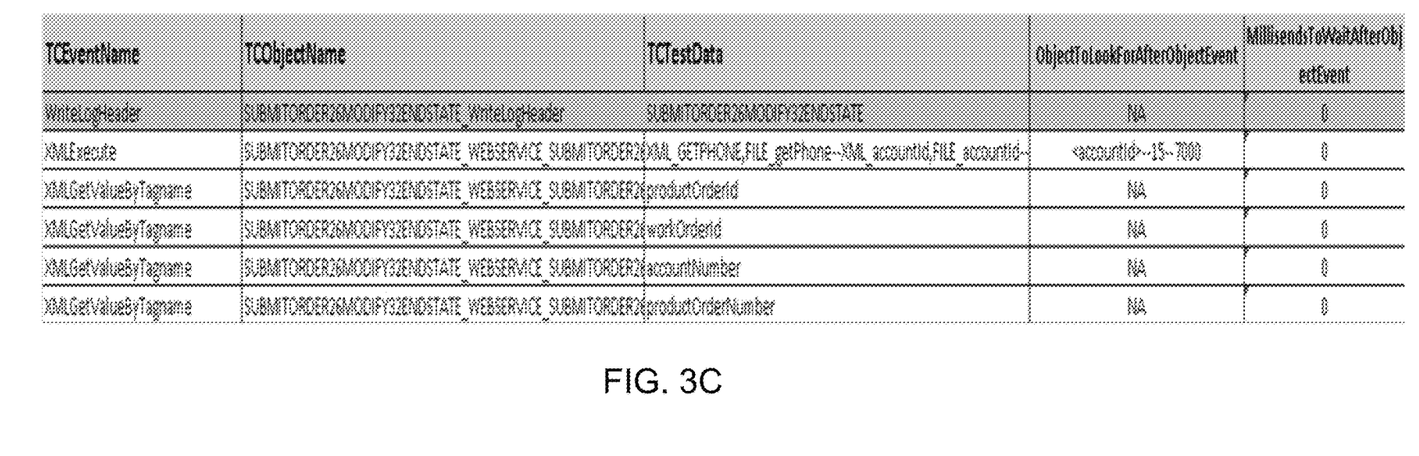

Reusable Components. In accordance with various embodiments, reusable components such as for systems hardware, software and/or components thereof may be defined and stored for later use. A component is a reusable module (e.g., series of test steps) which can be re-used as many times as a test case calls it. An example of a series of steps within one component is shown in FIG. 3C. The reusable components are stored in a database or other structure such as an Oracle database.

Figure 3D:
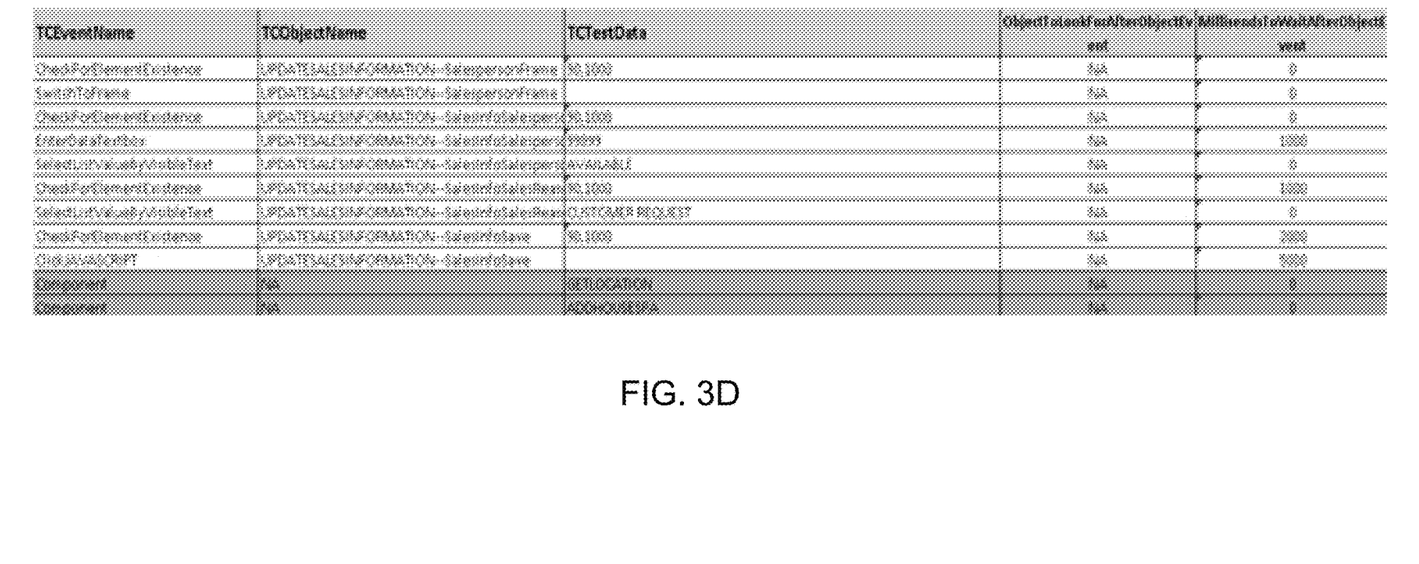

Automated Test Scripts. An automated test script is a series of test steps which are configured in the order in which they will be executed. FIG. 3D depicts an example of a series of steps within one test case. It is noted that the bottom two rows show calls to two of the components from the test case. Automated test scripts the generated according to various embodiments such as described herein with respect to the various figures.

Figure 3E:
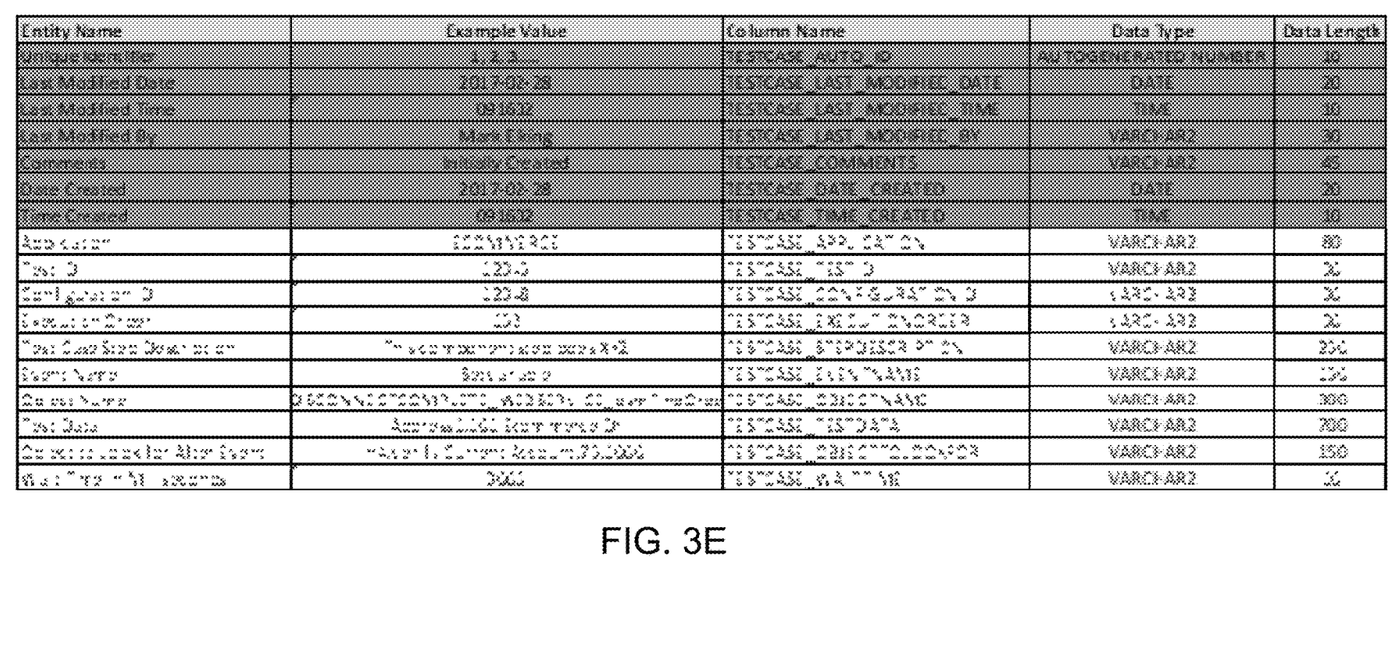

The test script generation engine 120, after performing the various processes described herein, stores all data (e.g., test cases, objects, components, events and the like) within, illustratively, Oracle database tables. The Test Utility allows the automation developer end user to Query, Create, Modify and Delete data which is stored in these Oracle tables. FIG. 3E depicts an example of a Table Definition specifically for Test Case.

The Jenkins server 170 comprises a known device that, illustratively, identifies newly revised source code (e.g., source code under test or directed to a device/system under test), compiles the code and build/delivers the application to the device intended to execute the code. Thus, in various embodiments, automated test scripts generated within the context of source code may be used to modify that source code to include embedded test data and/or test functions, such that the Jenkins server 170 automatically processes the modified source code and implement/invoke the modified source code including the embedded test data/functions at a system or device under test 160.

The systems/devices under test 160 comprise, illustratively, one or more of an application server 161, the database server 162, a web server 163, a UNIX server 164, a fileserver 165 and/or other servers or systems or devices to be tested 166, such devices including service provider devices, user devices, third party device, networking devices and, in general, any device or system suitable for testing in accordance with automatic testing scripts such as described herein.

The execution engine 140 retrieves automated test scripts from the database 110 and executes such test scripts. The execution engine is depicted as comprising a wrapper processor 142, an event/function mapper 144 and a function invocation module 146. The execution engine 140 may also include other processing modules 148.

In various embodiments, automation execution as described herein may be initiated via Eclipse during development or via Jenkins for end user execution.

Java Wrapper. Based on some runtime input parameters from the person executing the automated tests, the main Java Wrapper class pulls in the respective data from the Oracle tables (test case, objects, components, environment parameters, etc.) and loops through the series of test case/component steps making a call to the Event to Function map function.

Event to Function Map. The Event to Function Map function is a function which associates an input keyword event to the corresponding low level function. So if the test case is executing the EnterDataIntoTextbox event, this function knows to call the corresponding function to perform the enter data into textbox.

Java Functions. There are a finite number (illustratively 120) of Java Functions which are called from the Event to Function Map function. These Java Functions are the lowest level functions which perform the actions and validation against all of the servers and applications which are automated. The application, database, file, web and UNIX servers are all called from these Java Functions.

Figure 2:
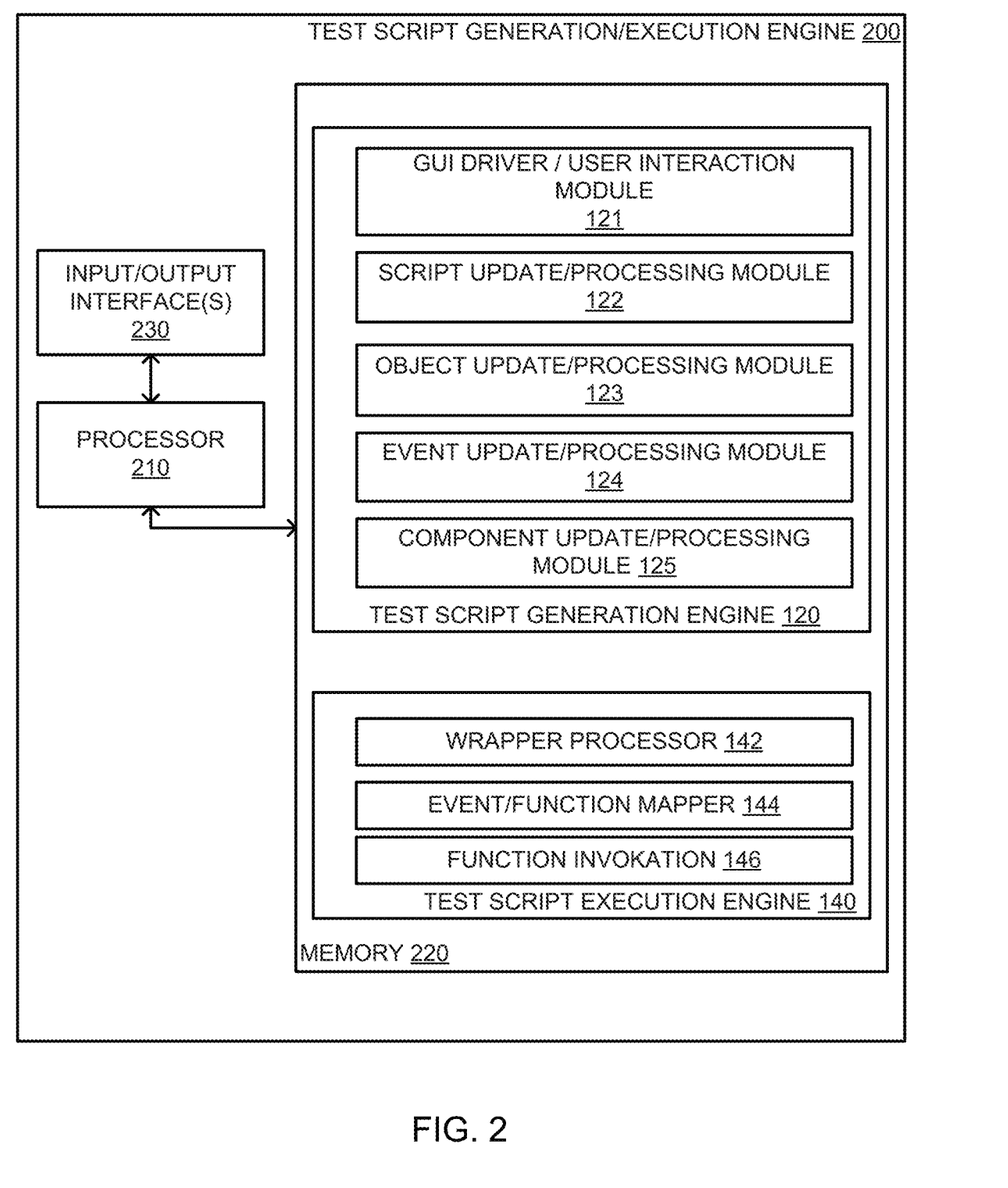
FIG. 2 depicts a high-level block diagram of an exemplary test script generation/execution engine suitable for use in the system of FIG. 1.

FIG. 2 depicts a high-level block diagram of a computing device implementing a test script generation engine according to one embodiment and suitable for use in performing the various functions as described herein.

As depicted in FIG. 2, computing device 200 includes a processor element 210 (e.g., a central processing unit (CPU) or other suitable processor(s)), a memory 220 (e.g., random access memory (RAM), read only memory (ROM), and the like), and an input/output interface 230 (e.g., GUI delivery mechanism, user input reception mechanism, web portal interacting with remote workstations and so on.

It will be appreciated that the functions depicted and described herein may be implemented in hardware or in a combination of software and hardware, e.g., using a general purpose computer, one or more application specific integrated circuits (ASIC), or any other hardware equivalents. In one embodiment, computer instructions are loaded into memory 220 and executed by processor 210 to implement the functions as discussed herein.

It will be appreciated that computing device 200 depicted in FIG. 2 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

The memory 220 is depicted as storing computer instructions executable by the processor 210 to implement various functions, such as test script generation engine functions including, illustratively, a GUI driver/user interaction module 121, a script update/processing module 122, an object update/processing module 123, an event update/processing module 124 and they component update/processing module 125. Similarly, the memory 220 is depicted as storing computer instructions to implement test script execution engine functions including, illustratively, a wrapper processor 142, the event/function mapper 144 and they function invocation module 146.

The update/processing modules 122-125 are generally configured to enable updating their respective data types to ensure that the necessary information associated with test scripts to be executed is available for GUI screen presentation, manipulation and functional implementation.

Figure 4:
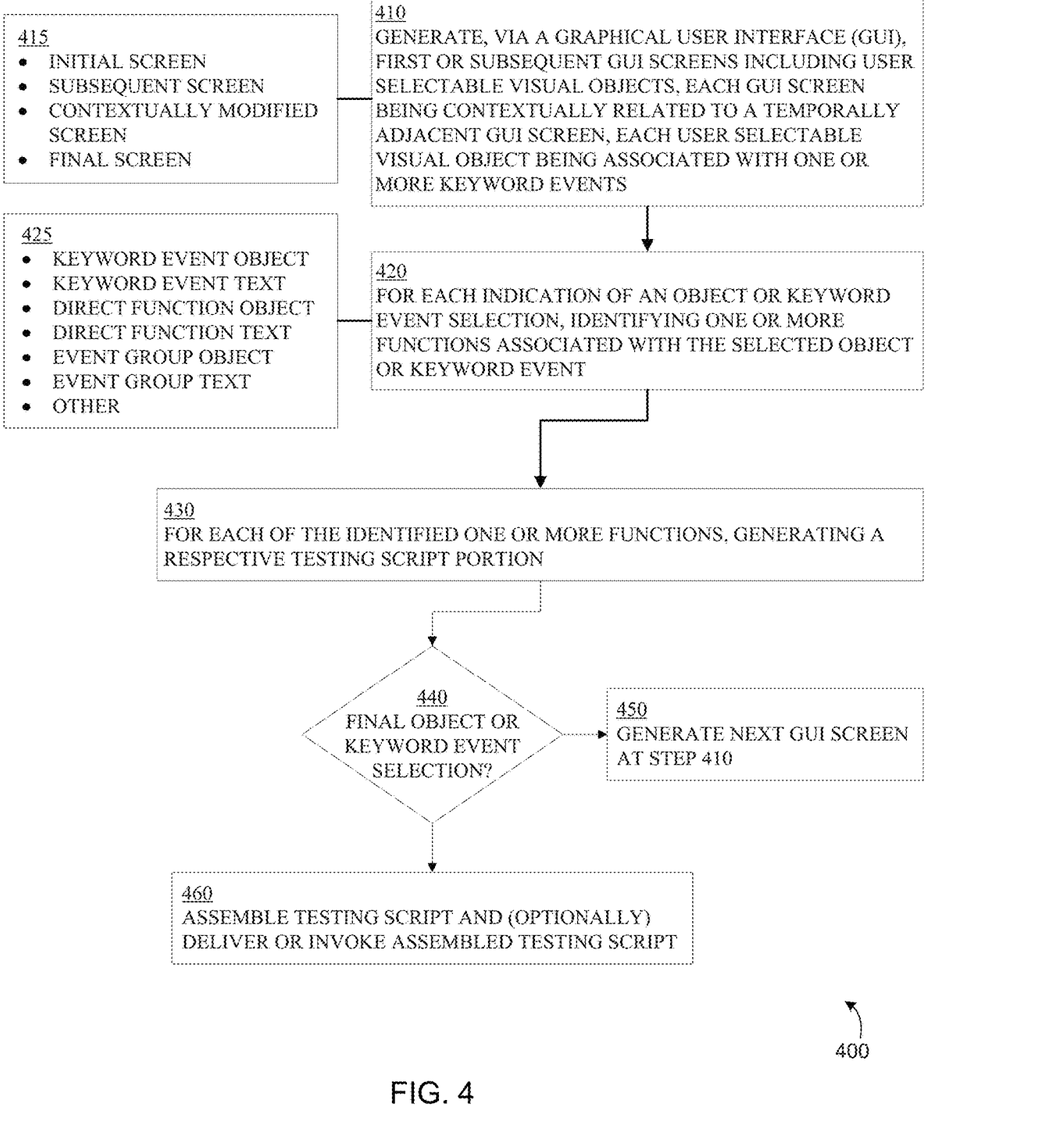
FIG. 4 depicts a method of executing a test script according to an embodiment.

FIG. 4 depicts a high-level block diagram of a method according to one embodiment. Specifically, the method 400 of FIG. 4 depicts one embodiment of a GUI driver/user interaction module 121 suitable for use within the context of the test script generation/execution engine 200 of FIG. 2. Various screens and user interactions for an example test case are also depicted and discussed below with respect to FIGS. 5-6.

At step 410, the method 400 generate, via a graphical user interface (GUI), a first or subsequent GUI screen including user selectable visual objects, or each GUI screen is contextually related to a temporal he adjacent GUI screen, and where each user selectable visual object is associated with one or more keyword events. Referring to box 415, the GUI screen may comprise an initial screen, a subsequent screen, a contextually modified screen and or a final screen. Contextually modified GUI screens comprise GUI screens including information relevant to the information displayed and/or received via a proceeding GUI screen.

At step 420, for each indication of an object or keyword event selection, the method identifies one or functions associated with the selected object or keyword event. Referring to box 425, such indication may be driven by a keyword event object, keyword event text, direct function object, direct function text, event group object, event group text or some other selection made by user by the GUI.

At step 430, for each of the identified one or more functions, the method generates a respective testing script portion.

At step 440, a query is made as to whether a final object or keyword event has been selected. If the query is answered negatively, then a next GUI screen is generated at step 450 and the method 400 proceeds to step 410. If the query is answered affirmatively, then the method 400 proceeds to step 460, where a final testing script is assembled and, optionally, delivered and/or invoked.

FIGS. 5A-5G depict illustrative UI screens useful in understanding the present embodiments, such as described above with respect to FIGS. 1-4.

Figure 5A:
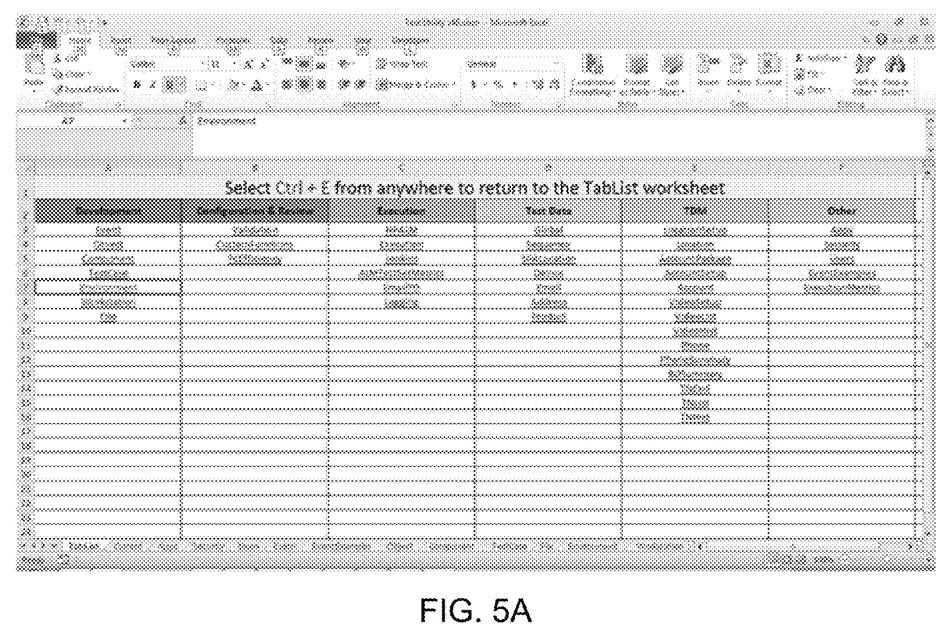
FIGS. 5A-5H depict illustrative UI screens useful in understanding the present embodiments.
Figure 5B:
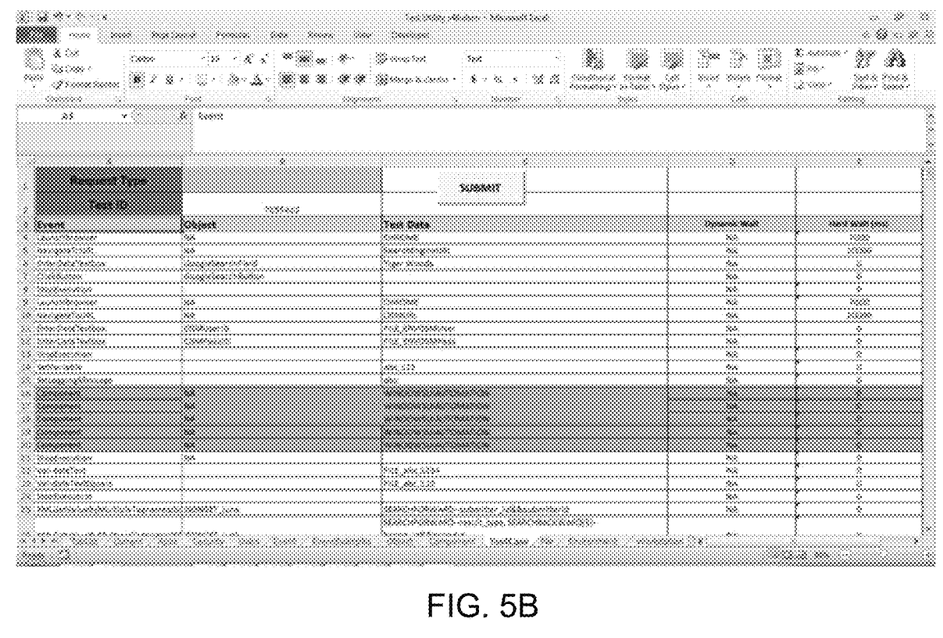
Figure 5C:
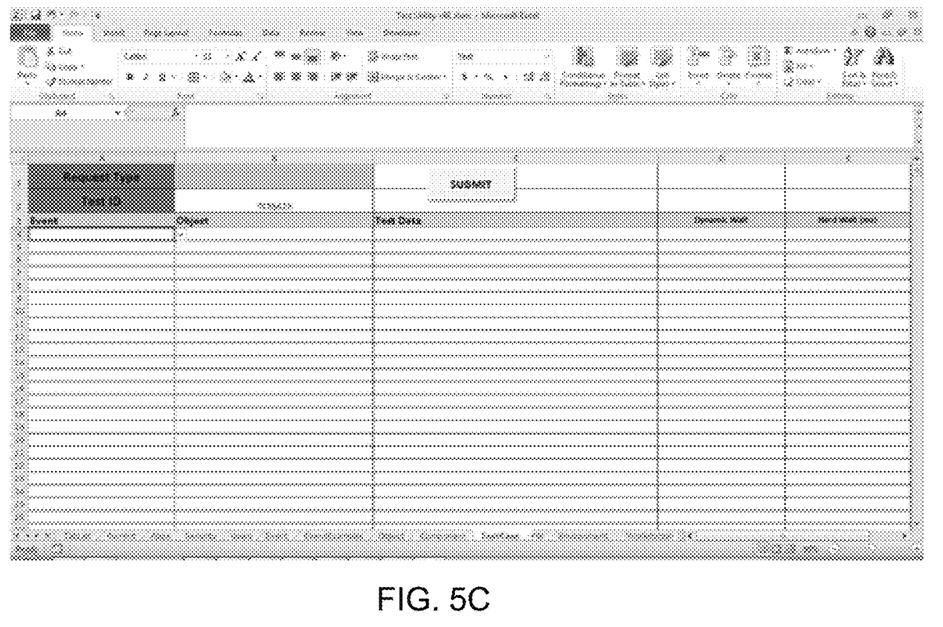

FIG. 5A depicts a TabList view UI screen, which may comprise an initial screen presented to an end user accessing a system in accordance with various embodiments to build/develop an automated test case. The illustrative TabList view comprises a first column showing optional views used by automation developers for developing the automation test case. User interaction indicative of a selection of the "TestCase" hyperlink will result in the display of a "TestCase" UI screen, such as depicted with respect to FIG. 5B (which includes a test case already populated with a number of user selected testing steps/actions) of FIG. 5C (which is a new test case having no user selected testing steps/actions).

Figure 5D:
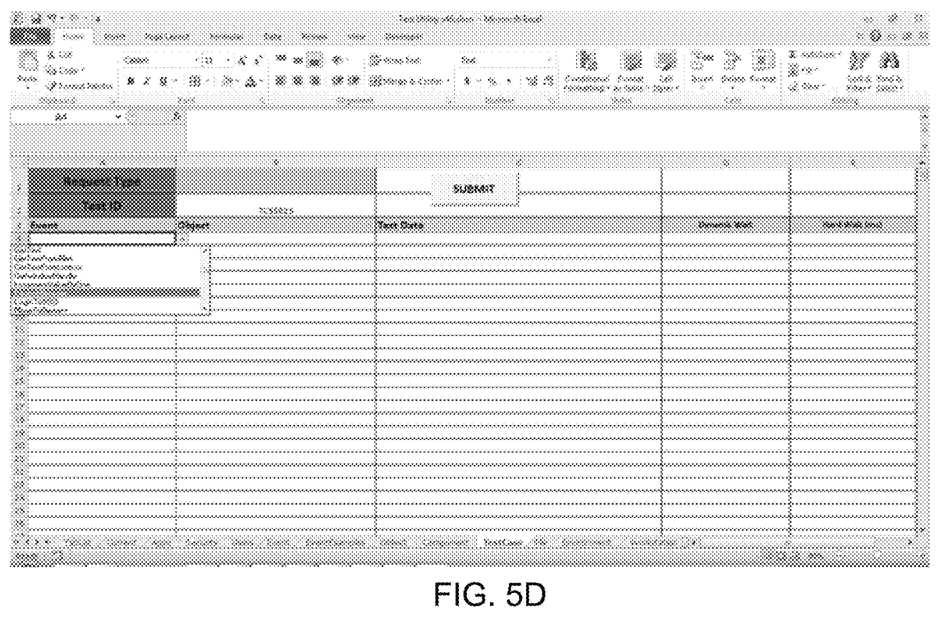
Figure 5E:
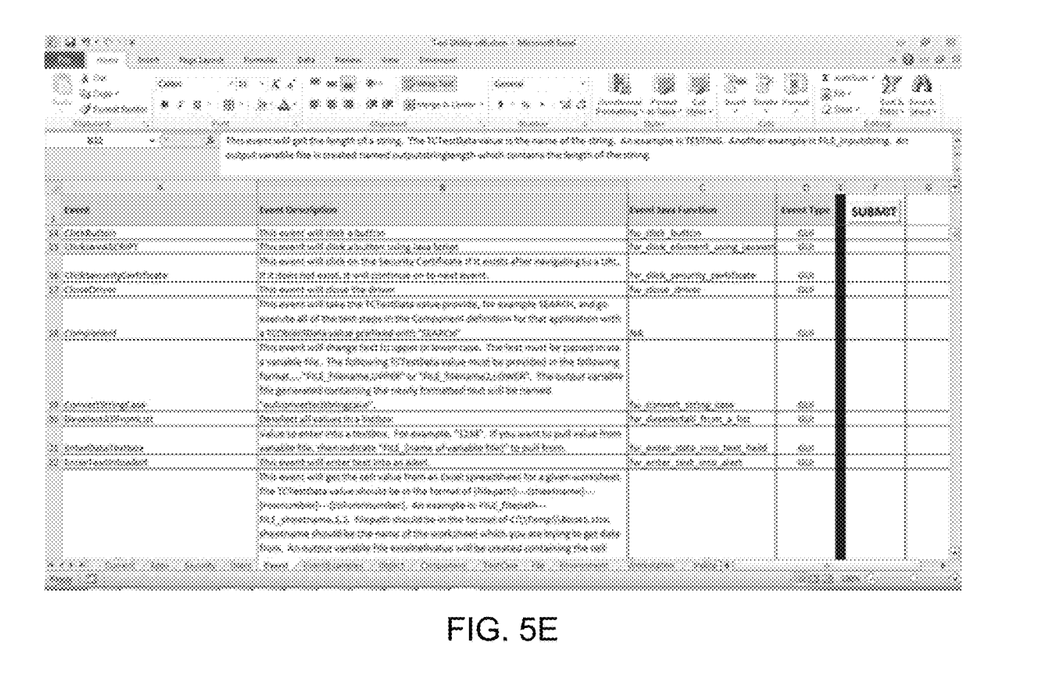
Figure 5F:
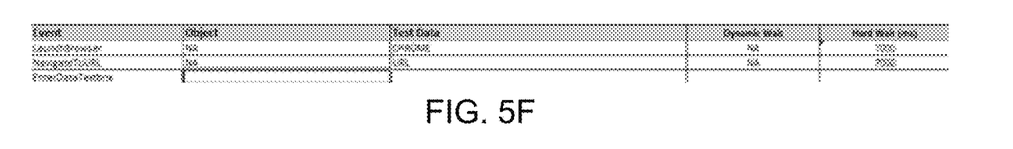
Figure 5G:
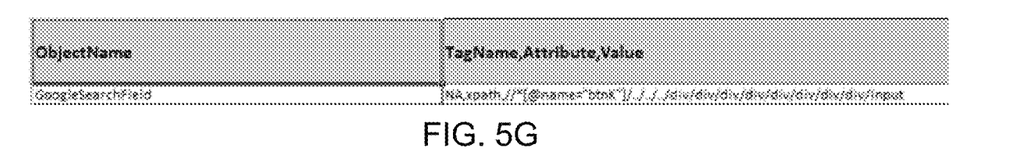
Figure 5H:
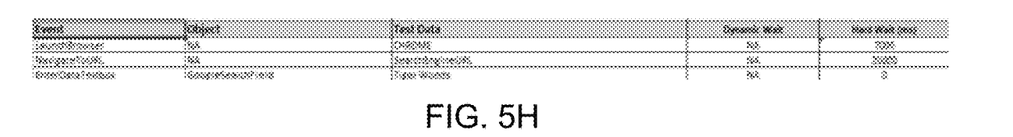

Assuming a new test case (i.e., FIG. 5C), to start an automated testing case the user selects "Event" information, such as via a dropdown box as depicted in FIG. 5D. If the user is unsure of the purpose or function of a particular Event, then the user may navigate to an "EventView" UI screen to view event descriptions, such as depicted in FIG. 5E wherein a number of events and corresponding descriptions are displayed. For example, various events include a "LaunchBrowser" event wherein entering CHROME, IE or EDGE which into the data field launches a browser window using, respectively, the Chrom, Internet Explorer and Edge browsers. These events (and others) may be associated with hard wait or persistence times (e.g., 7000 or 20000 ms) which provide a time limit within which the event must be executed.

Figure 6:
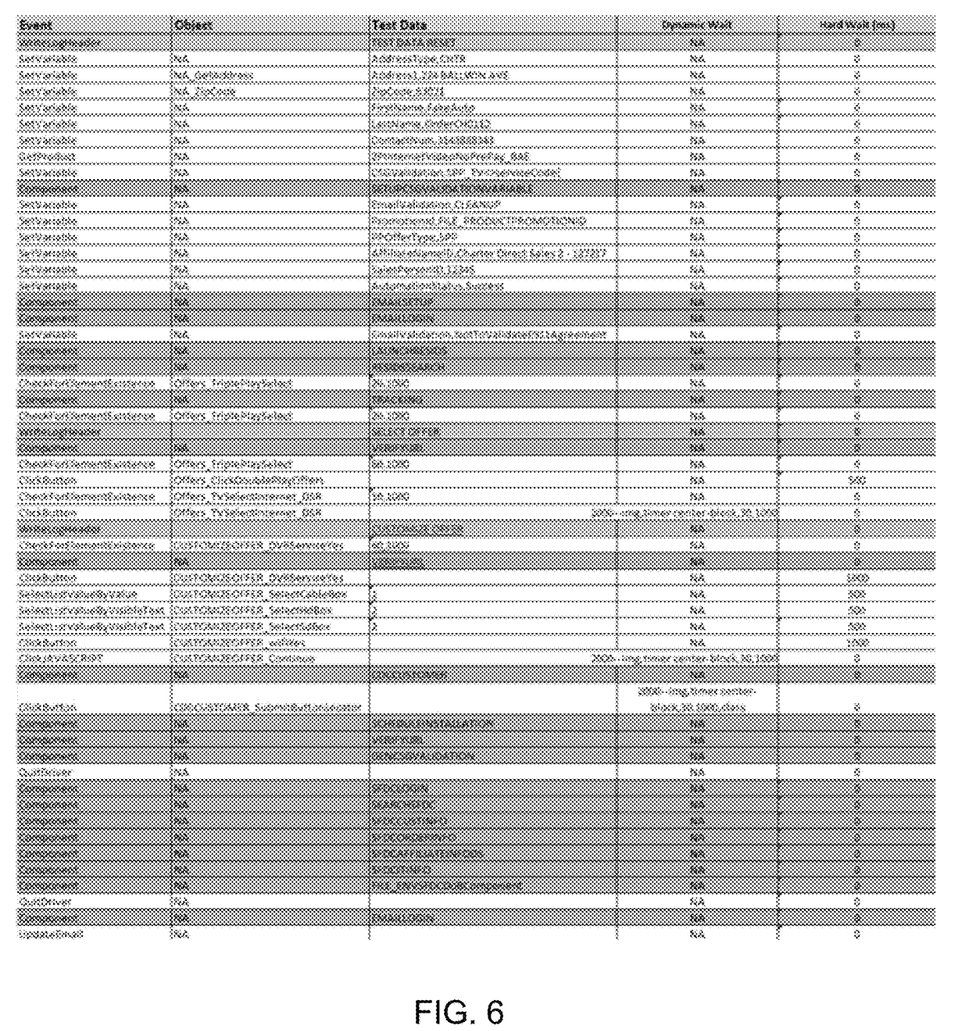
FIG. 6 depicts an illustrative test case useful in understanding the present embodiments.

As an example, to enter data in a TextBox, the user first selects the Event "EnterDataTextbox" in the TestCase view (FIG. 5F), then the user define an object such as "GoogleSearchField" in the Object view (FIG. 5G), and then the user references the object OSMUserID and OSMPassID in the TestCase view (FIG. 5H) as well as references the user ID and pass ID. This process may be repeated for each of as many events as appropriate to build the desired test case. An illustrative test case is depicted at FIG. 6, though an actual test case would have specific entries appropriate to a real world test case.

The various embodiments discussed herein provide a test utility such as a DBA application test utility to automate the generation of test cases/scripts for use within an integrated software/systems test environment.

The various embodiments provide a keyword and data driven automation framework with standardized input parameters which are stored in, illustratively, relational custom built tables. There are Java/Selenium functions which correspond to keyword events. This solution allows manual testers to be easily trained on automating test cases. This solution does not require them to know programming languages for test automation development. This automation framework provides an efficient and end user friendly automation test development interface, giving easier maintainability, faster execution of tests and higher reliability. The framework allows for easy configuration across multiple environments, multi-threaded execution for efficiency, easy reporting and metrics generation. The framework uses HP ALM as the central test case repository, Java/Selenium technology, Git source code repository, Maven for building and Jenkins for execution.

The disclosed test automation framework contains common events for automating software applications. The framework supports automation across GUI interfaces, Webservices, Database, Unix and File operations. The automation framework can be used to automate test cases, create test data and clean test data.

Portability Between Testing Environments

Figure 7:
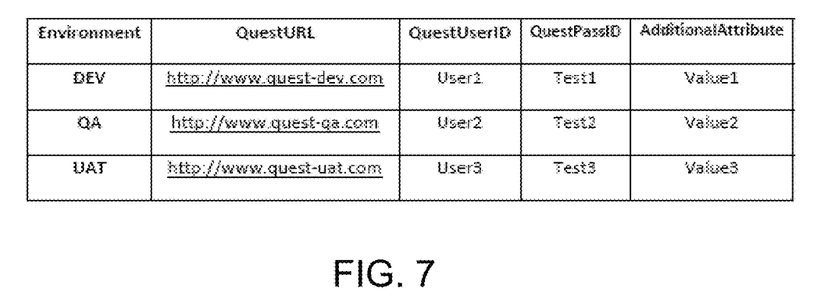
FIGS. 7-9 depict illustrative UI screens useful in understanding the present embodiments.

Various embodiments of the above-described test automation framework support using the same automation scripts across multiple environments, such as DEV, UAT and the like. In these embodiments, an additional Environment configuration entry in the Environment configuration worksheet maybe used, along with appropriate corresponding values which will allow the same automated scripts to be executed across multiple environments. FIG. 7 depicts an illustrative example of three values (QuestURL, QuestUserID, QuestPassID). The end user/tester selects which environment the test scripts are to be executed within (e.g., execute 100 automated test scripts in the QA environment), and those automated test scripts would execute in the appropriate environment using the corresponding three Quest values for that QA environment. If the end user/tester selects a different environment (i.e. UAT) then those same automated test scripts would execute in the UAT environment using the corresponding three Quest values pertaining to the UAT environment. If additional environment attributes are required in the test cases, then the automation developer can simply add additional attributes on the Environment worksheet as shown below. Inside the automated test case, the automation developer may reference the VAR AdditionalAttribute and the value corresponding to the environment selected would be used. The number of additional attributes which can be used in infinite. No additional Java programming is required.

In this manner, new and existing automated test scripts may be configured for use in many environments without the need to replicate the automated test scripts for each environment.

Dynamic Components

Figure 8A:
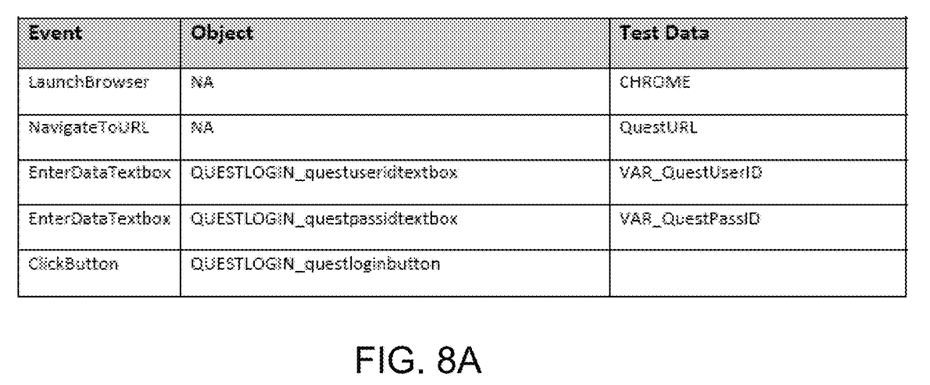
Figure 8B:
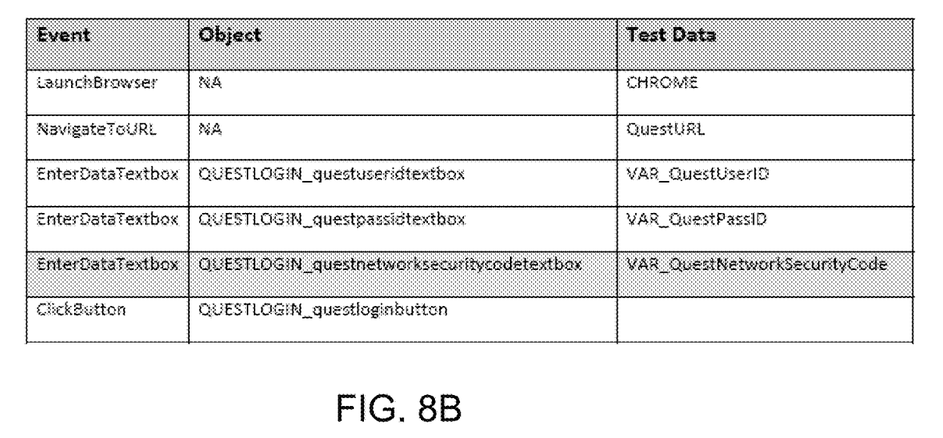
Figure 8C:
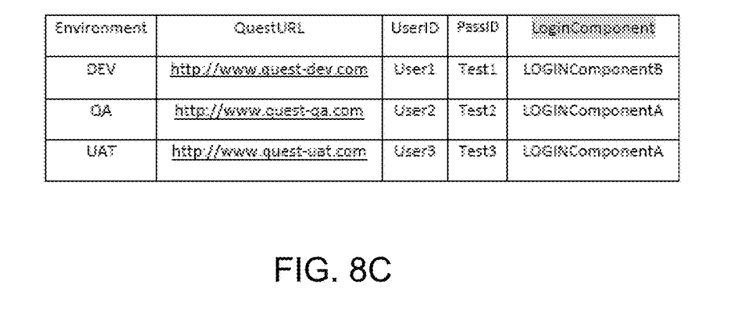
Figure 8D:
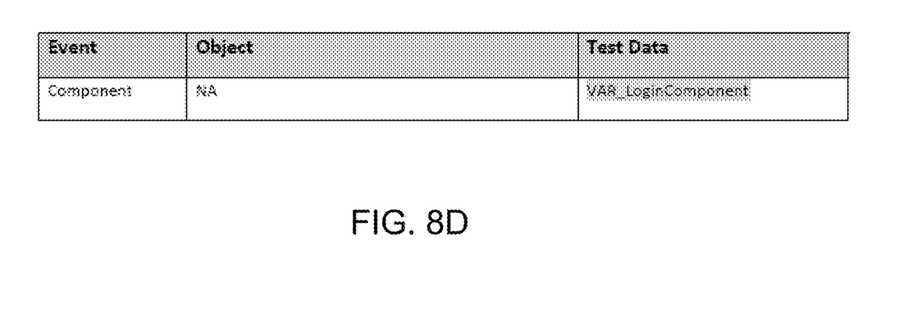

In various embodiments where the same automated test scripts are used across multiple environments as described above, the automation framework is configured to support variations in functionality without needing to replicate the automated scripts (not all environments contain the same version of application code). For example, assume automated test cases built on the same version of Quest application code deployed in the three above-mentioned environments (DEV, QA and UAT). The automated test cases will use common components, such as a login component denoted as LOGINComponentA and depicted in FIG. 8A. If the login component is to be updated for only one environment, such as by adding an additional Network Security Code field on the Login screen for the Quest application, this may be implemented for that environment alone by creating another Login component to support the additional field, illustratively LOGINComponentB, such as depicted in FIG. 8B. Further, the Environment worksheet may then have added to it an additional attribute column, illustratively denoted as LoginComponent such as depicted in FIG. 8C. In this example, the DEV environment will use a LoginComponent value of LoginComponentB, whereas the QA and UAT environments will use a LoginComponent value of LoginComponentA, and the test case will reference the dynamic component variable VAR LoginComponent as depicted in FIG. 8D. In this manner, different functionalities may be configured in the application with respect to the automated test scripts without needing to replicate the automated test scripts Dynamic Object Definitions Object/Field definition for automation is mandatory in some cases, such as when using WebUI or WindowsUI automation. Typically, 90% of object definitions are static definitions. An example would be ("id="Address1"). However, 10% of the time there are objects which are defined with dynamic values. For example, the text on a button might have the Account # generated when the end user generated their account. An example would be ("xpath=//span[text( )='—VAR_AccountValue—']). In this example, whatever account number was generated in the test execution would be passed into the Object definition dynamically.

Figure 9:
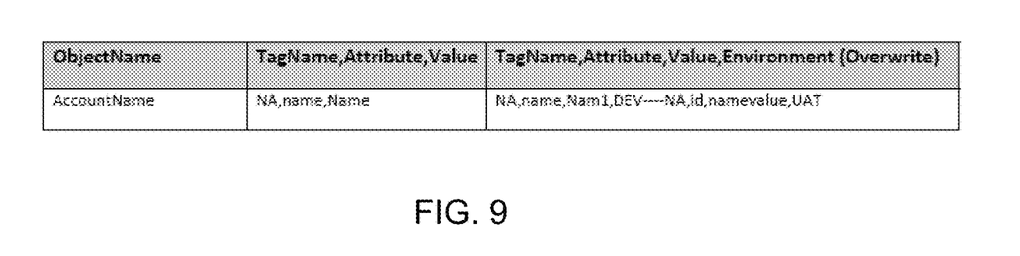

Various embodiments operate to minimize maintenance of automation scripts by minimizing the number of automated test scripts that must be created by sharing test scripts across multiple environments as described above. Further, the various embodiments may support defining different object definitions per environment as required. A default object definition for any given field is found via, illustratively, TagName,Attribute,Value. The value defined is the default object definition value for that field for all environments. If there is a different object definition for that same field in one other environment, then the user may navigate to the Object worksheet and overwrite the object definition for that field for that environment. For example, as depicted in FIG. 9, for test cases executed in the DEV environment, any automated tests using an AccountName field will use the object definition (name="Nam1"). If executed in the QA environment, any automated tests using the AccountName field will use the object definition (name="Name"). If executed in the UAT environment, any automated tests using the AccountName field will use the object definition (id="namevalue").

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A computer-implemented method of automatically generating a testing script, the method comprising:
   iteratively generating, via a graphical user interface (GUI), a plurality of GUI screens including user selectable visual objects, each GUI screen being contextually related to a temporally adjacent GUI screen, each user selectable visual object being associated with one or more keyword events;
   for each indication of a visual object selection or a keyword entry received via the GUI, identifying one or more functions associated with the selected visual object or keyword entry;
   for each of the identified one or more functions, generating a respective testing script portion; and
   in response to an indication of a final keyword event selection, assembling the generated testing script portions into a complete testing script.

2. The computer implemented method of claim 1, wherein the user selectable visual objects presented by the GUI are visually adapted in response to one or more indications of keyword event selection.

3. The computer implemented method of claim 1, wherein in response to an indication of a keyword event selection requiring additional information, the user selectable visual objects presented by the GUI are adapted to enable user input of the additional information.

4. The computer implemented method of claim 1, wherein the keyword events are associated with one or more of the following event groups: Web based UI interactions, Windows based UI interactions, Webservice XML operations, Unix based interactions, Windows based DOS file operations, Database SQL operations and Java String Manipulation operations.

5. The computer implemented method of claim 2, wherein said assembling the generated testing script portions in to a complete testing script comprises:
   determining a testing environment within which the test script portions are to be utilized; and
   generating the test script portions in accordance with the determined testing environment.

6. The computer implemented method of claim 1, further comprising:
   executing the complete testing script at a system or device under test.

7. The computer implemented method of claim 1, further comprising:
   executing the complete testing script at a Jenkins server operative to control a system or device under test.

8. The computer implemented method of claim 1, further comprising:
   executing the complete testing script via a testing environment operative to control a system or device under test.

9. The computer implemented method of claim 1, further comprising adding the generated test script to one or more previously generated test scripts to provide thereby a plurality of tests scripts configured to perform a series of tests of a system or device under test.

10. The method of claim 6, wherein the system or device under test comprises one or more of an application server, a database server, a web server, a UNIX server, a fileserver, a service provider device or a user device.

11. A non-transitory computer readable medium storing instructions which, when executed by a computing device, cause the computing device to perform a method of automatically generating a testing script, the method comprising:
   iteratively generating, via a graphical user interface (GUI), a plurality of GUI screens including user selectable visual objects, each GUI screen being contextually related to a temporally adjacent GUI screen, each user selectable visual object being associated with one or more keyword events;
   for each indication of a visual object selection or a keyword entry received via the GUI, identifying one or more functions associated with the selected visual object or keyword entry;
   for each of the identified one or more functions, generating a respective testing script portion; and
   in response to an indication of a final keyword event selection, assembling the generated testing script portions into a complete testing script.

12. A test script generation engine, comprising a processor configured for:
   iteratively generating, via a graphical user interface (GUI), a plurality of GUI screens including user selectable visual objects, each GUI screen being contextually related to a temporally adjacent GUI screen, each user selectable visual object being associated with one or more keyword events;
   for each indication of a visual object selection or a keyword entry received via the GUI, identifying one or more functions associated with the selected visual object or keyword entry;
   for each of the identified one or more functions, generating a respective testing script portion; and
   in response to an indication of a final keyword event selection, assembling the generated testing script portions into a complete testing script.

* * * * *